Aug. 27, 1968    JEAN-PIERRE VASSEUR    3,399,273
CIPHERING SYSTEM

Filed April 23, 1964    3 Sheets-Sheet 2

Inventor
Jean-Pierre Vasseur
By Cushman, Darby & Cushman
Attorneys

United States Patent Office 3,399,273
Patented Aug. 27, 1968

3,399,273
CIPHERING SYSTEM
Jean-Pierre Vasseur, Paris, France, assignor to CSF—Compagnie Generale de Telegraphie Sans Fil, a corporation of France
Filed Apr. 23, 1964, Ser. No. 361,985
Claims priority, application France, Apr. 23, 1963, 932,348
5 Claims. (Cl. 178—22)

ABSTRACT OF THE DISCLOSURE

A system for transmitting and receiving secret pulse modulated signals, comprising means at the transmitter for inserting, between N intelligence pulses, digit signals having random levels, such digit signals being eliminated at the receiver.

---

The present invention relates to the ciphering of messages which have been first pulse code modulated in a system in which information is expressed by a sequence of digital signals, i.e. signals of the same duration having predetermined levels and a predetermined repetition frequency. Such messages may be, for example, telegraphic messages, calculator data or suitably processed telephonic conversations.

In the ciphering technique it is often desired to make the traffic continuous and to encode the silent periods during which no information is passed. Such silent periods are filled up with sequences of identical pulses. This may lead to the discovery of the ciphering key, thus endangering the security of the message transmitted.

Furthermore it may occur that two messages are ciphered by means of the same key. This can be discovered if the silent periods coincide in part, which again may facilitate the deciphering by those who should have no access to the message.

It is an object of the invention to obviate these drawbacks. To this end, the invention adds random digit signals to the pulse coded message before the ciphering thereof, such digit signals being eliminated in the course of the deciphering procedure.

According to the invention, each intelligence digit signal is compressed in time while random digit signals are inserted into the silent periods thus provided, the sequence of digits preserving its recurrent character.

The invention will be described hereafter in the usual case of binary pulses. However, it is to be understood that it also applies to multi-level pulses.

The invention will be better understood from the following description and appended drawings, wherein.

Figure 1:
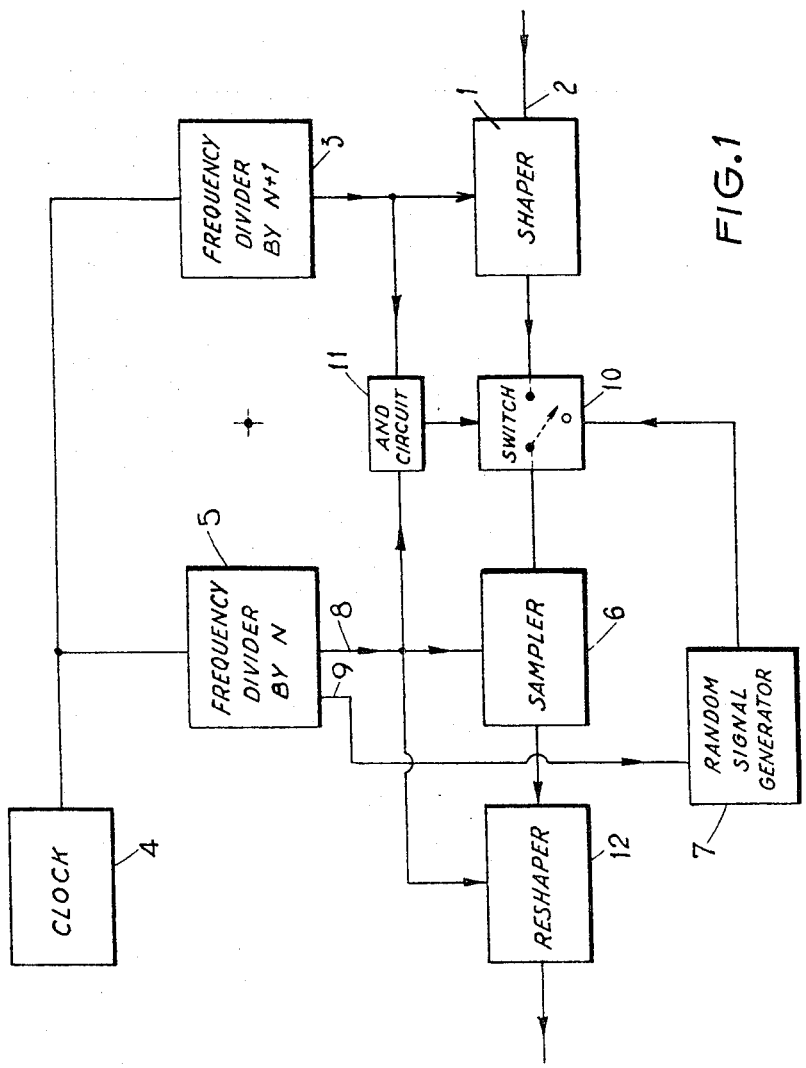
FIG. 1 is a block diagram of a system according to the invention as used at the transmitting end.

The circuit shown in FIG. 1 comprises a shaping circuit 1, of a known type. Circuit 1 receives the digits in clear at a frequency F′ at its input 2 and recurrent pulses at a frequency F′ at its other input. Circuit 1 shapes said pulses into digital rectangular pulses at frequency F′.

Pulses as frequency F′ are obtained by dividing by $N+1$, in a frequency divider 3, the frequency of pulses provided by a clock 4. N stands for the number of digits between two successive random digits which are added to the message, according to the invention.

Clock 4 also feeds another frequency divider 5, which provides pulses at frequency F, thus dividing its input frequency by N. Frequency F is the frequency imposed by the transmission circuit characteristics.

Divider 5 controls a sampler circuit 6, which is connected at its output 8, and a random signal generator 7, which is connected at its output 9.

Figure 2:
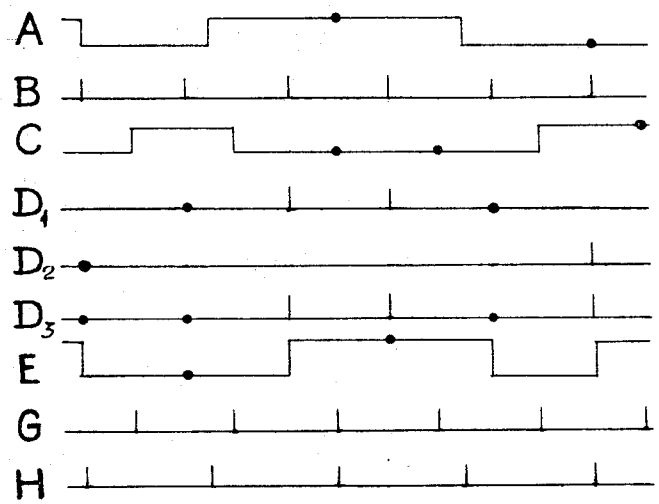
FIG. 2 shows the waveforms at various points of the diagram shown in FIG. 1.
Figure 4:
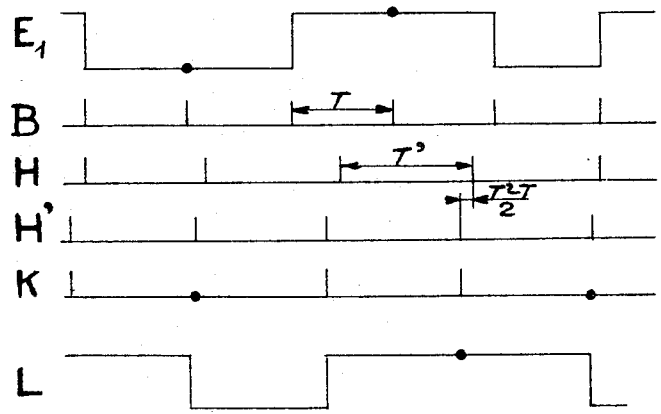
FIG. 4 shows the waveforms at different points of FIG. 3.

The message formed by digital signals of frequency F′ is shaped in device 1, as shown at A in FIG. 2.

This waveform is applied to sampler 6 through a switch 10. The latter is controlled by an "AND" gate 11, whose two inputs are respectively coupled to the output of divider 3 and to the output 8 of divider 5. Switch 10, according to the position it occupies under the action of gate 11, couples to sampler 6 either shaper 1 or generator 7. The signals from shaper 1, while transmitted to sampler 6, are sampled at frequency F by the latter, thus providing the waveform $D_1$. The signals at the output 8 of divider 5 are shown at B in FIG. 2. The signals at the output of sampler 6 are applied to one input of a reshaping device 12, the other input of which receives waveform B, said input being coupled to output 8.

On the other hand, switch 10 also transmits the output signals of generator 7 shown at C in FIG. 2. These signals are digital signals, of zero or one amplitude, which follow each other in a random succession, with a repetition frequency F and are out of phase by a half period with respect to signals B.

To this end, generator 7 is controlled by frequency divider 5, to the output 9 of which it is connected and whose output is shown at G in FIG. 2. Signals C, while transmitted, are sampled at frequency F in sampler 6, thus providing signals $D_2$, shown in FIG. 2.

Signals $D_1$ and $D_2$ form at the output of sampler 6 a signal sequence $D_3$. Signals $D_3$ are shaped by device 12 yielding finally signals E.

Signal sequences $D_1$ and $D_2$ combine as follows: switch 10 couples device 1 and device 6, except when it receives signals from the "AND" gave 11, i.e. when signal B and signal H from divider 3 coincide. When such a coincidence occurs, switch 10 connects generator 7 to sampler 6. Therefore, when signals B and H coincide, $D_2$ is provided, whereas $D_1$ is provided when B and H do not coincide.

Since frequency dividers 3 and 5 divide the same frequency respectively by $N+1$ and N, one has $$\frac{F'}{F}=\frac{N}{N+1} \text{ or } F'+\frac{F'}{N}=F$$

Consequently, coincidence at the two inputs of gate 11 will occur every N digits of the message and, at this time, a random digit will be inserted in the message.

All the circuits used and shown in FIG. 1 are known per se to those skilled in the art and need not be described in detail.

With the above description in mind, the building of the deciphering system to be used at the receiving end is obvious to those skilled in the art, it being noted that signals E have to be transformed into signals A, and the random signals inserted at the transmitting end are to be eliminated. Generally such a system will be similar to that shown in FIG. 1, except that generator 7 will have to be omitted.

Figure 3:
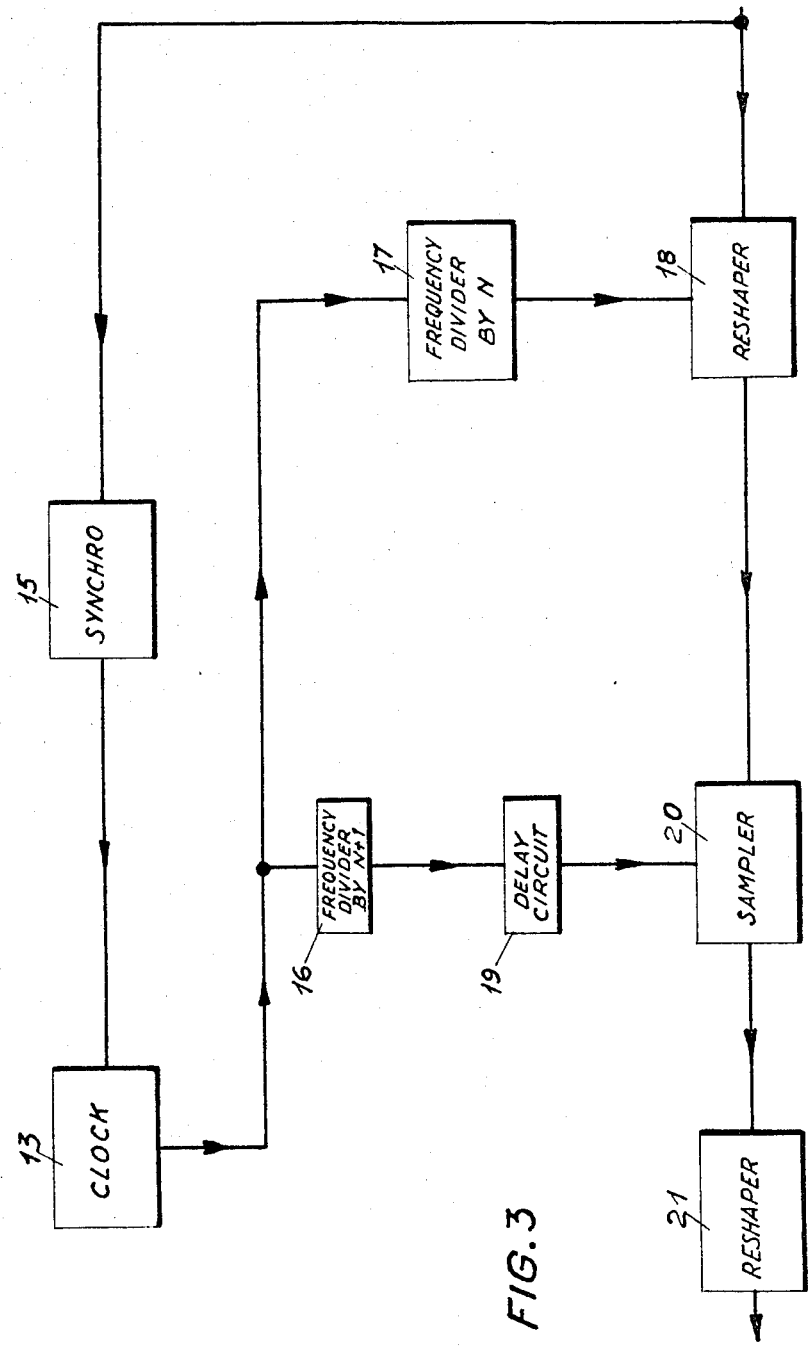
FIG. 3 shows a block diagram of a system according to the invention as used at the receiving end.

One embodiment of such a system is shown in FIG. 3. It comprises a clock 13 which generates pulses at a frequency NF. This clock is synchronized by the received signals E by means of a known synchronizer 15.

The output signals of clock 13 are applied to a divider 16 which divides frequency NF by $N+1$, thus providing signal H at frequency F′.

The output signals of clock 13 are also applied to a divider 17 which divides frequency NF by N, thus providing signals B at frequency F.

Signals B are applied to a reshaper circuit 18 which also receives signals E which are accurately phased with respect to the output signals of clock 13, thus providing signals $E_1$.

The output signals of divider 16 are applied to a delay circuit 19 which delays them by $$T + \frac{T'-T}{2}$$

T being the period of signals B and T' the period of signals H.

Signals H' are thus obtained, these signals leading signals H by $$\frac{T'-T}{2}$$

Signals H' are applied to a sampler circuit 20 which provides at its output signals K.

Signals K are applied to a reshaper circuit 21, which provides at its output signals L, which are the original signal A delayed by one period.

The invention is obviously not limited to the particular embodiment described, many modifications being within the reach of those skilled in the art without it being necessary to depart from the spirit and scope of the invention.

What is claimed is:

1. A system for ciphering a sequence of recurrent multi-level, rectangular input signals having a repetition frequency F', said system comprising: means for sampling said signals at a frequency F with $$F' = \frac{FN}{N+1}$$

N being an integer, thus providing recurrent digital pulses; means coupled to said sampling means for inserting after each sequence of N of said pulses a pulse having in a random manner any one of a plurality of levels and means, coupled to said sampling means, for reshaping said pulses into recurrent digital rectangular signals at said frequency F.

2. A system for ciphering a sequence of recurrent multi-level digital rectangular input signals having a repetition frequency F', said system comprising: means for generating further rectangular signals at a frequency F with $$F' = \frac{FN}{N+1}$$

N being an integer, said further rectangular signals having in a random manner any one of a plurality of predetermined levels; sampling means, coupled for receiving said recurrent multi-level input signals and coupled to said generating means, said sampling means sampling at said frequency F, said input signals and said further signals to provide further recurrent digital pulses of frequency F; and means, coupled to said sampling means, for reshaping said pulses into recurrent digital rectangular signals at said frequency F.

3. A system for ciphering a sequence of recurrent multi-level digital rectangular input signals having a repetition frequency F', said system comprising: means for generating further rectangular signals at a frequency F with $$F' = \frac{FN}{N+1}$$

N being an integer, said further rectangular signals having in a random manner any one of a plurality of predetermined levels; sampling means, coupled for receiving said recurrent multi-level input signals and coupled to said generating means, said sampling means sampling, at said frequency F, said input signals and said further signals to provide further recurrent digital pulses of frequency F; means, coupled to said sampling means, for reshaping said pulses into recurrent digital rectangular signals at said frequency F; switching means having a first position for coupling said input signals to said sampling means and a second position for coupling said generating means to said sampling means; and means for bringing said switch from said first into said second position after each sequence of N input signals.

4. A system for deciphering a sequence of recurrent multi-level digital rectangular input signals having a repetition frequency F, said system comprising: means for providing recurrent pulses at a frequency $$F' = \frac{FN}{N+1}$$

N being an integer; means for delaying said pulses by $$T + \frac{T'-T}{2}$$

with $T = 1/F$ and $T' = 1/F'$, said delaying means having an output; sampling means for sampling said input signals, said sampling means having a control input, coupled to said output, and an output; and reshaping means connected to said sampling means output.

5. A system for deciphering a sequence of recurrent multi-level digital rectangular input signals having a repetition frequency F, said system comprising: means for providing recurrent pulses at a frequency $$F' = \frac{FN}{N+1}$$

N being an integer, said means for providing said recurrent pulses at frequency F' comprising means for providing a predetermined phase relationship between said recurrent pulses and said input signals; means for delaying said pulses by $$T + \frac{T'-T}{2}$$

with $T = 1/F$ and $T' = 1/F'$, said delaying means having an output; sampling means for sampling said input signals, said sampling means having a control input, coupled to said output, and an output; and reshaping means connected to said sampling means output.

References Cited
UNITED STATES PATENTS

| | | | |
|---|---|---|---|
| 2,412,964 | 12/1946 | Chatterjea et al. | 325—122 |
| 2,637,845 | 5/1953 | Craiglow | 178—22 |
| 2,777,897 | 1/1957 | Gretener et al. | 179—1.5 |

THOMAS A. ROBINSON, *Primary Examiner*.